United States Patent [19]
Gomyo et al.

[11] Patent Number: 5,778,948
[45] Date of Patent: Jul. 14, 1998

[54] METHOD FOR INSERTING A FLUID IN A BEARING DEVICE

[75] Inventors: Masato Gomyo; Kazuaki Oguchi, both of Nagano, Japan

[73] Assignee: Sankyo Seiki Mfg. Co., Ltd., Nagano-ken, Japan

[21] Appl. No.: 496,139

[22] Filed: Jun. 28, 1995

[30] Foreign Application Priority Data

Jun. 29, 1994 [JP] Japan .................. 6-170112

[51] Int. Cl.$^6$ .................. B65B 31/00
[52] U.S. Cl. .................. 141/7; 141/5; 141/51; 141/65; 29/898.1; 384/133; 184/29
[58] Field of Search .................. 141/4, 5, 7, 8, 141/51, 59, 65; 277/80, 135; 184/6, 22, 29, 57, 55.1, 55.2; 384/100, 107, 133; 29/898.1

[56] References Cited

U.S. PATENT DOCUMENTS

| | | | |
|---|---|---|---|
| 4,753,276 | 6/1988 | Inaba et al. | 141/7 |
| 4,809,354 | 2/1989 | Kawashima | 384/133 X |
| 4,928,376 | 5/1990 | Poglitsch | 141/5 X |
| 4,938,611 | 7/1990 | Nii et al. | 384/133 |
| 4,949,368 | 8/1990 | Kubo | 384/507 X |
| 5,067,528 | 11/1991 | Titcomb et al. | 141/4 |
| 5,161,900 | 11/1992 | Bougathou et al. | 384/133 |
| 5,323,818 | 6/1994 | Yakubowski | 141/7 |
| 5,372,432 | 12/1994 | Ishikawa | 384/133 |
| 5,479,967 | 1/1996 | Zytkovicz et al. | 141/7 |
| 5,524,728 | 6/1996 | Williams et al. | 184/29 |
| 5,583,906 | 12/1996 | Sugiura et al. | 378/132 |

*Primary Examiner*—J. Casimer Jacyna
*Attorney, Agent, or Firm*—McAulay Fisher Nissen Goldberg & Kiel, LLP

[57] ABSTRACT

A method for inserting fluid in a bearing device containing a fixed member and a rotating member. The fixed member and the rotating member of the bearing device are assembled in a high pressure environment and subsequently placed in a low pressure environment. While in the low pressure environment, bearing fluid is placed in a space between the fixed member and the rotating member. The fixed member and rotating member along with the bearing fluid are then placed in the high pressure environment to fully disperse the bearing fluid in the space between the fixed member and the rotating member.

9 Claims, 7 Drawing Sheets

METHOD FOR INSERTING A FLUID IN A BEARING DEVICE

BACKGROUND OF INVENTION

1. Field of Invention

The present invention relates to a method for inserting a fluid in a bearing device, and more particularly to a method for inserting a fluid between a fixed member and a rotating member of a dynamic pressure bearing device.

2. Description of Related Art

Spindle motors used for rotating disks which record and transmit data are required to rotate at high speeds to provide users with a high speed data transmission capability. Conventional spindle motors use ball bearings, however, the use of ball bearings has several drawbacks. Specifically, ball bearings do not allow for a precise rotation of a motor and also produce noise when a motor is rotated at high speeds.

Conventional spindle motors also use fluid bearings. In particular, conventional spindle motors also use dynamic pressure bearing devices containing a magnetic bearing fluid. Nevertheless, spindle motors which use these types of bearings have many drawbacks as well. Most notably, the bearing fluid expands and leaks from the spindle motors as a result of changes in temperature and humidity. Additionally, the bearing fluid leaks as a result of the spindle motors being placed upside down or on their side by users of the hard disk drives containing the spindle motors. The leaking bearing fluids contaminate the disks being rotated and fatal problems associated with the storing and transmitting of data result.

Conventional spindle motors containing dynamic pressure bearing devices, such as the one shown in Japanese Unexamined Patent Application No. SHO 61-241520 and described below, have additional problems as well.

Figure 6:
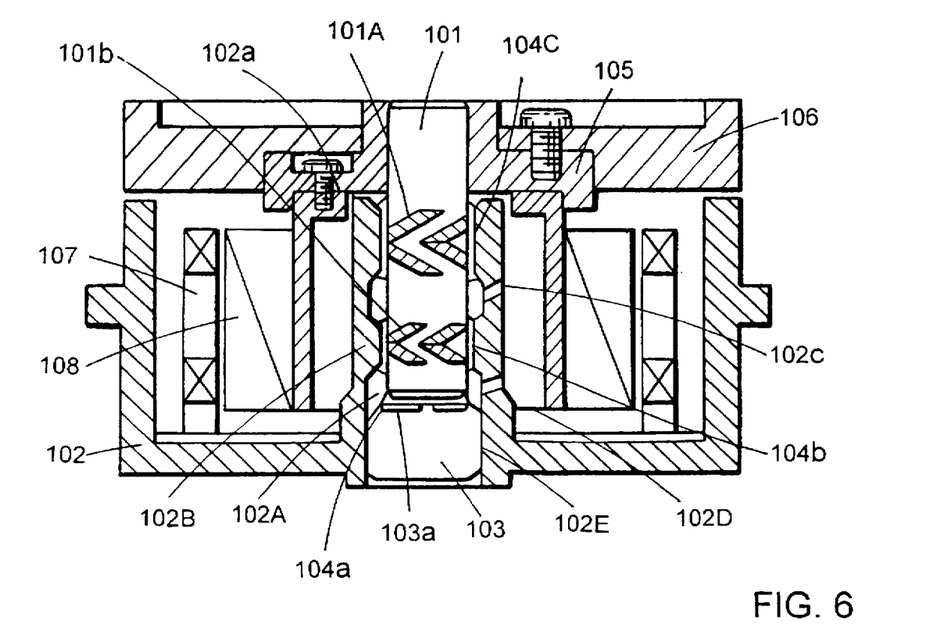
FIG. 6 illustrates a transverse sectional view of a prior art motor.
Figure 7A:
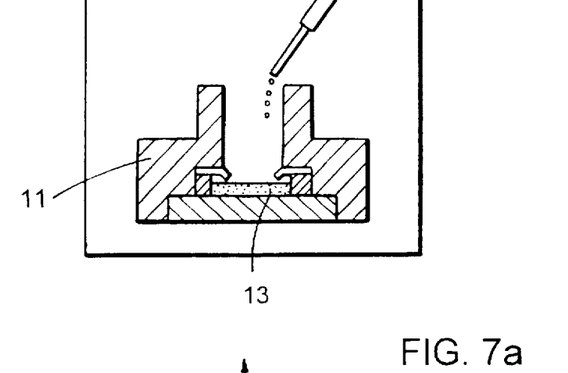
FIG. 7 illustrates steps in a method for inserting magnetic bearing fluid in a dynamic pressure bearing device according to a fourth embodiment of the invention.
Figures 7B, 7C:
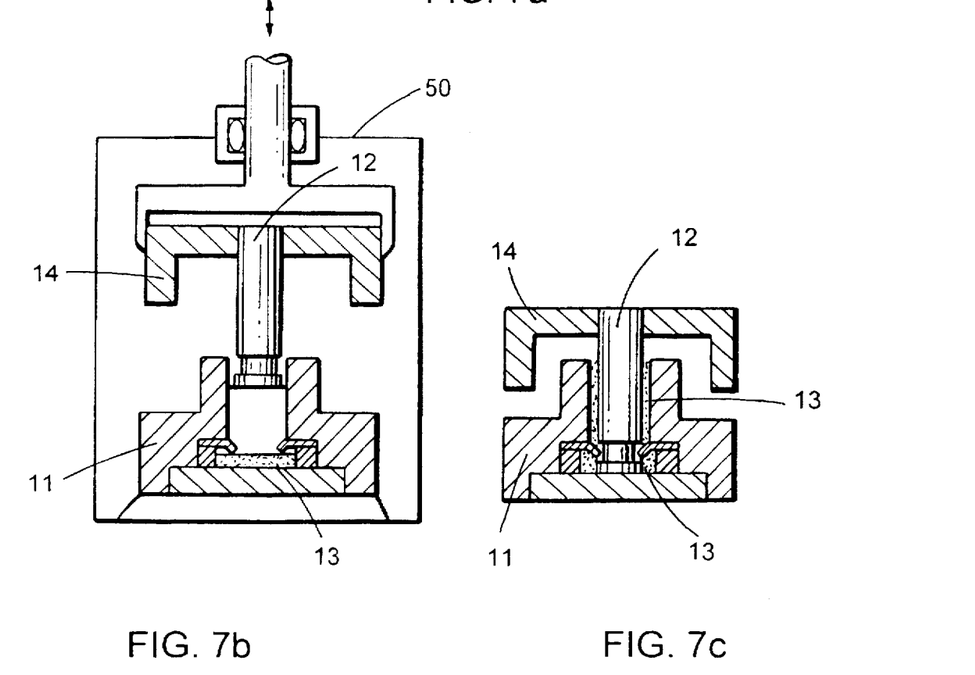
Figure 8A:
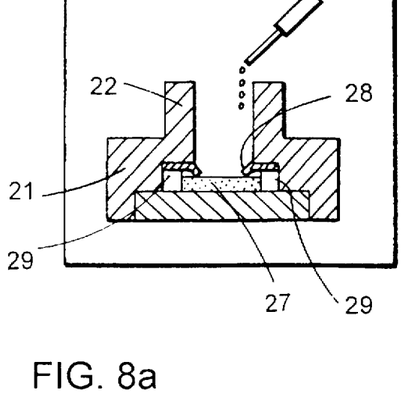
FIG. 8 illustrates steps in a method for inserting magnetic bearing fluid in a dynamic pressure bearing device according to a fifth embodiment of the invention.
Figure 8B:
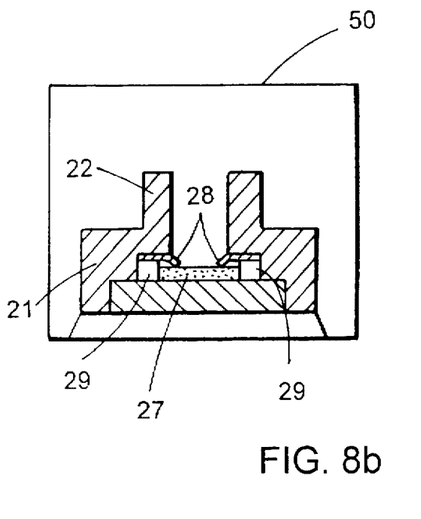
Figure 8C:
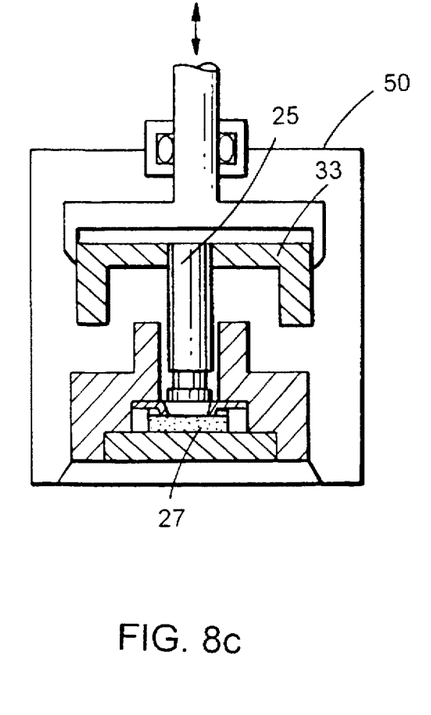
Figure 8D:
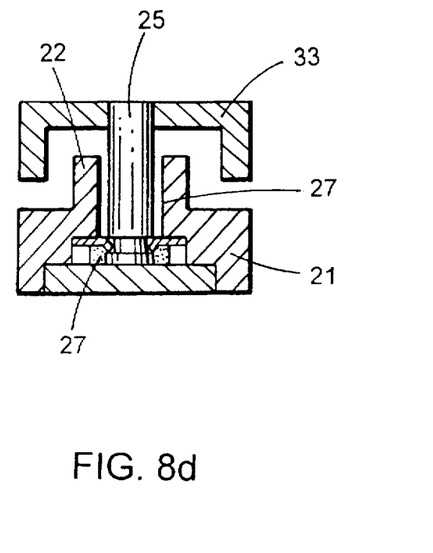

Referring to FIG. 6, which shows a conventional dynamic pressure bearing device according to the aforementioned application, disclosed is a shaft 101 is with dynamic pressure generating grooves 101A and 101B. The shaft 101 is fit into a bearing hole 102A such that it can freely rotate within the bearing hole 102A. An upper portion of the bearing hole 102A adjacent to dynamic pressure generating grooves 101A maintains the same diameter as a lower portion of the bearing hole 102A adjacent to dynamic pressure generating grooves 101B. A cylindrical thrust member 103, which includes a spiral groove 103A, is inserted into a bearing hole 102E positioned below the bearing hole 102A.

Various portions of bearing fluid are included in the device shown in FIG. 6. Bearing fluid 104C is held in a vicinity between dynamic pressure generating grooves 101A and a surface of the bearing hole 102A, bearing fluid 104B is held between dynamic pressure generating grooves 101A and a surface of the bearing hole 102A, and bearing fluid 104A is held between a spiral groove 103A and a bottom portion of the shaft 101.

The shaft 101 is rotated by magnetic forces generated from a fixed motor member 107 and a rotating motor member 108. The shaft 101 rotates in a noncontact manner with the surfaces of the bearing hole 102A and cylindrical thrust member 103 as a result of a pumping action produce by the dynamic pressure grooves 101A and 101B, and spiral grooves 103A.

The spindle motor shown in FIG. 6 contains several other components as well. For example, the spindle motor includes lower part cylinder 102, sleeve portions 102B, ventilation hole 102C, disk 105, and upper cylinder 106.

2

The bearing hole 102E, which is positioned below the bearing hole 102A, maintains a diameter larger than that of the bearing hole 102A to accommodate the cylindrical thrust member 103 containing the spiral groove 103A. The cylindrical thrust member 103 is press fit into the bearing hole 102E.

A gap 102F is formed adjacent to the shaft 101 beneath dynamic pressure generating groove 101B. The gap 102F is larger than a bearing slit or space formed between the shaft 101 and a surface of the bearing hole 102A at locations adjacent to the dynamic pressure generating grooves 101A and 101B. A ventilation hole 102D is provided to allow the gap 102F to communicate with an environment outside the bearing.

By providing the gap 102F and the ventilation hole 102D, foam or air bubbles which contaminate the bearing fluids can be exhausted. Moreover, the ventilation hole 102D prevents the foam or air bubbles in the bearing fluids from expanding and pressing the bearing fluids out of the device when subject to changes in pressure or temperature.

However, the dynamic pressure bearing device disclosed in Japanese Unexamined Patent Application No. 61-241520 as discussed above has certain problems. In particular, the bearing fluids do not completely fill the space between shaft 101 and the bearing hole 102A. In fact, the bearing fluids are placed only in the vicinity of the dynamic pressure generating grooves 101A and 101B and the spiral groove 103A. Consequently, the bearing fluids: (i) deteriorate and fail to properly lubricate the device; (ii) diminish in quantity due to evaporation; (iii) become abraded as a result of usage; or (iv) become scorched and stick to a surface of the bearing device.

To overcome these problems, a large amount of bearing fluid needs to be placed around the shaft 101. However, if a large amount of bearing fluid were placed in the device shown in FIG. 6, it would leak from the ventilation hole 102D and stain the inside of the motor. Filling this hole with a stopper or resin, such as an adhesive, is not a solution to the problem because the stopper or the resin will fatigue and deteriorate as a result of use and environmental changes.

Moreover, even if the ventilation holes were successfully sealed, there still exists a problem with successfully inserting a large amount of bearing fluid in the space formed between the shaft 101 and the bearing hole 102A. In particular, when bearing fluid is inserted in the space and placed under pressure, the bearing fluid is prevented from becoming uniformly dispersed in the space given the presence of air pockets. As a result, it is difficult to successfully insert and uniformly disperse bearing fluid into the space formed between the shaft 101 and the bearing hole 102A.

OBJECTS AND SUMMARY OF THE INVENTION

It is accordingly an object of the present invention to provide a method for inserting bearing fluid in a space formed by a fixed member and a rotating member of a dynamic pressure bearing device which will result in the bearing fluid being uniformly dispersed and retained in the space.

It is another object of the invention to provide a method for inserting bearing fluid in a space formed by a fixed member and a rotating member of a dynamic pressure bearing which will allow the fixed member and rotating member to be easily assembled.

It is yet another object of the invention to provide a method for inserting bearing fluid in a space formed by a

3 fixed member and a rotating member of a dynamic pressure bearing device where magnetic powder is mixed in the bearing fluid.

In accordance with one aspect of the invention, a method for inserting a bearing fluid in a dynamic pressure bearing device is defined, where the method comprises transferring a bearing fluid held in a space between a fixed member and a rotating member from a low pressure environment to a high pressure environment, where the pressure difference between the two environments causes the bearing fluid to be filled in the space. Using this method to insert the bearing fluid allows the fixed member and the rotating member to be easily assembled such that a high performance dynamic pressure bearing device can be effectively manufactured.

In accordance with another aspect of the invention, a method for inserting a bearing fluid in a dynamic pressure bearing device is disclosed, where the bearing device uses a magnetic fluid as a bearing fluid, a fixed member, a rotating member, and a magnetic body. The method according to this aspect of the invention comprises the steps of inserting the magnetic fluid in the fixed member such that it is held by the magnetic body under a high pressure environment, and then transferring the magnetic fluid, fixed member, and magnetic body from the high pressure environment to a low pressure environment and assembling the rotating member with the fixed member. Using a magnetic body to hold the magnetic fluid prevents the magnetic fluid, while in the low pressure environment, from foaming and forming in a passage of the fixed member where the rotating member is placed, such that air is allowed to escape. Using this method to insert the bearing fluid, also allows the fixed member and the rotating member to be easily assembled such that a high performance dynamic pressure bearing device can be efficiently manufactured.

Additional objects and advantages of the invention will be apparent from the foregoing general description and following detailed description and drawings. It is to be understood that the descriptions are exemplary and explanatory only and are not restrictive of the invention as claimed.

BRIEF DESCRIPTION OF THE DRAWINGS

The accompanying drawings are included to provide an understanding of the invention and constitute a part of the specification.

4

DETAILED DESCRIPTION OF THE INVENTION

Figure 4:
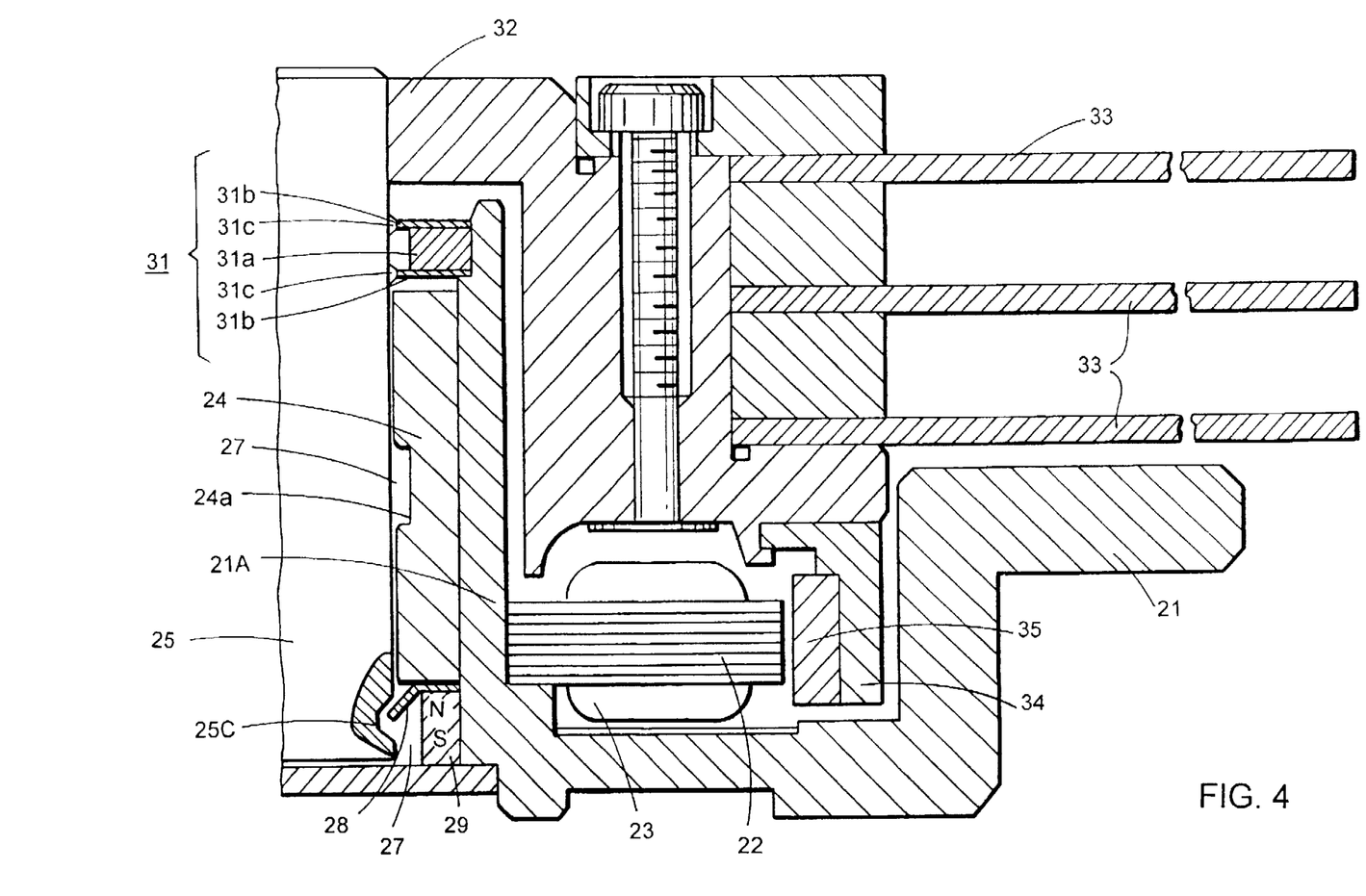
FIG. 4 illustrates a half transverse sectional view of a hard disk drive motor and is an example of a device to which the present invention is applied.

A hard disk drive motor to which the present invention is applied is described below with reference to FIG. 4. The hard disk drive motor contains a motor frame 21 which includes near its center a hollow cylindrical bearing holder 21A. Fixed to an outside perimeter of the bearing holder 21A is a stator core 22 having a plurality of salient poles. Wound on each of the salient poles of the stator core 22 is a driving coil 23.

Press fit to an inside perimeter of the bearing holder 21A is a dynamic pressure radial slide bearing 24. Formed at a center of the dynamic radial slide bearing 24 is an escape portion 24a which is a circular recess.

The dynamic pressure radial slide bearing 24 receives a rotating shaft 25 which is a magnetic body. The rotating shaft 25 is placed in the dynamic pressure radial slide bearing 24 such that a cylindrical space is formed between the two members. An end of the rotating shaft 25 is placed on a thrust plate 26. The thrust plate 26 is inserted into the inside perimeter of the bearing holder 21A and, as will be described below, is designed to function as a a dynamic pressure thrust bearing.

A plurality of herringbone shaped dynamic pressure grooves are arranged along the outside perimeter of the rotating shaft 25. Similarly, herringbone shaped dynamic pressure grooves are formed on a top surface of the thrust plate 26. These dynamic pressure grooves function as dynamic pressure generating means.

Bearing fluid 27, which is a magnetic fluid, is inserted and filled in the space formed between the dynamic pressure radial slide bearing 24, the rotating shaft 25, and the thrust plate 26. This results in the rotating shaft 25 being supported, during rotation, by a radial dynamic pressure and a thrust dynamic pressure of the bearing fluid 27. Specifically, when the shaft 25 is rotated, a dynamic pressure is generated by a pumping action of the above-mentioned dynamic pressure grooves. This dynamic pressure results in (i) the rotating shaft 25 being supported in the radial direction without contacting the side surface of the dynamic pressure radial slide bearing 24; and (ii) the rotating shaft 25 being supported in the thrust direction without contacting the thrust plate 26.

This phenomenon results due to the manner in which the dynamic pressure generating grooves communicate with bearing fluid 27 placed in the space around the rotating shaft 25. In particular, as the bearing fluid 27 flows into a bent portion of the dynamic pressure generating grooves on the side of the rotating shaft 25, a pumping action results which circulates the bearing fluid 27 in the space surrounding the sides of the rotating shaft 25. Consequently, the bearing fluid 27 is continuously fueled to the surfaces of the rotating shaft 25 allowing the housing 24 to function as a dynamic pressure radial slide bearing. Similarly, when the bearing fluid 27 flows into a bent portion of the dynamic pressure generating grooves on the thrust plate 26, a pumping action circulates the bearing fluid 27 in the space beneath the bottom of the rotating shaft 25. The bearing fluid 27 being continuously fueled to the bottom surface of the rotating shaft 25 also allows the thrust plate 26 to function as a dynamic pressure thrust slide bearing.

The dynamic pressure generating grooves can alternatively be placed on the radial slide bearing 24 or on the bottom of the rotating shaft 25. This alternative configuration produces the same results as discussed above.

An engagement projecting piece 28 is press fit to a lower end surface of the dynamic pressure radial slide bearing 24 along with a ring-shaped magnetic body 29. The engagement projecting piece 28 is an elastic body such as a spring member which is shaped like a disk. A plurality of notches are radially positioned on the disk to define a a large number of elastic engagement parts which project toward the rotating shaft 25.

A radius of a circle formed by the engagement projecting piece 28 is smaller than a radius of the rotating shaft 25 and larger than a radius of anchor peripheral groove 25C. The engagement projecting piece 28 is diagonally bent inward toward the thrust plate 26 into the anchor peripheral groove 25C. As a result, the rotating shaft 25 can be elastically rotated and flexibly moved while being centered by the engagement projecting piece 28.

The anchor peripheral groove 25C is a recess formed on the rotating shaft 25 at a position opposite to the engagement projecting piece 28. The anchor peripheral groove 25C is recessed at a depth which allows the rotating shaft 25 to maintain its balance during rotation by receiving the engagement projecting piece 28 in a noncontact manner. As a result, the rotary shaft 25 is also prevented from being removed from the motor by upward lifting forces.

A magnetic body 29 is provided which is magnetized in an axial direction. As a result, the bearing fluid 27, which contains magnetic powder, is held between the rotating shaft 25 and the thrust plate 26.

A magnetic seal 31 is placed at an open upper end of the bearing holder 21A to seal the bearing fluid 27. The magnetic fluid seal 31 includes a magnet 31a which is magnetized in an axial direction and pole pieces 31b which are also magnetized. The pole pieces 31b sandwich the magnet 31a such that a magnetic fluid seal 31c is formed by the bearing fluid 27 collected between the inside periphery of the pole pieces 31b and the outside of the rotating shaft 25.

A hub 32 is press fit to an upper end of rotating shaft 25 and covers the stator core 22 and drive coil 23. The hub 32 includes a plurality of magnetic disks 33, a yoke 34, and a ring shaped drive magnet 35. The drive magnet 35 is attached to the yoke 34 at a position opposite the stator core 22.

Figure 1A:
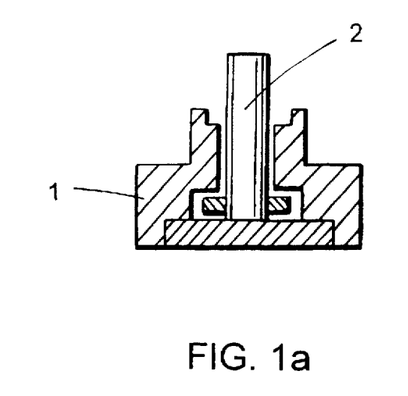
FIG. 1 illustrates steps in a method for inserting bearing fluid in a dynamic pressure bearing device according to a first embodiment of the invention.
Figure 1B:
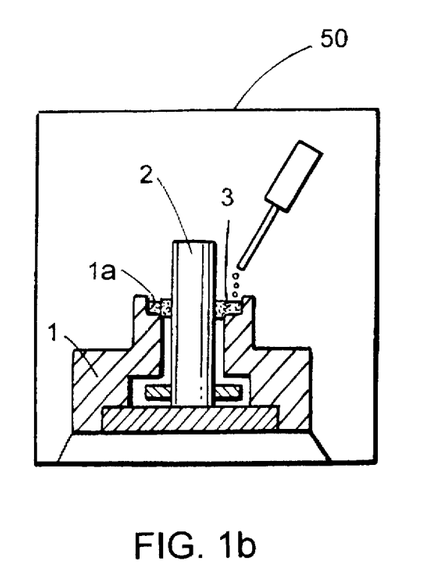

A first embodiment of the invention will now be described with reference to FIG. 1. Referring to FIG. 1(a), under atmospheric conditions such as air, a shaft 2 is first inserted into a motor frame 1 with a space being formed between the two parts. Referring to FIG. 1(b), the assembled parts as a whole are then inserted into a sealed chamber 50 and a vacuum pump, which is not shown is, reduces the pressure inside the chamber 50 to a vacuum state.

At this point in the process, a predetermined amount of bearing fluid 3, which is a magnetic fluid, is placed in an oil storage area 1a formed between the shaft 2 and the motor frame 1 by an instrument, such as a robot, which is is not shown. The bearing fluid 3 remains filled in the storage area 1a given the forces formed between the bearing fluid 3 and its adjacent surfaces.

The bearing fluid 3, prior to being applied to oil storage area I a, is also subjected to the pressure change described above. As a result, any foam or air bubbles contaminating the bearing fluid 3 at atmospheric conditions is formed into a whip when the bearing fluid 3 is placed in the vacuum state and removed.

Figure 1C:
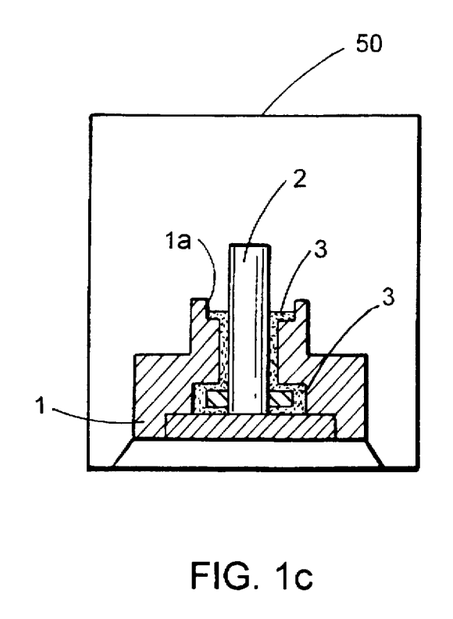
Figure 1D:
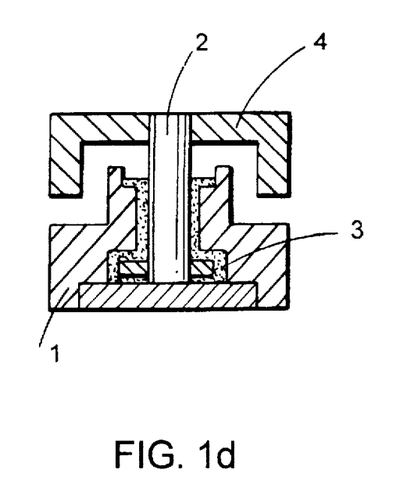

Referring to FIG. 1(c), after the bearing fluid 3 is placed in oil storage area 1a in the vacuum state, the pressure in the chamber 50 is returned the atmospheric level. When the air pressure at the atmospheric level acts upon the bearing fluid 3, the space between the shaft 2 and motor frame 1 is filled with the bearing fluid 3. As shown in FIG. 1(d), the entire assembly is then removed from the sealed chamber 50 and a required member 4, for example a hub, is bonded to the shaft 2 to complete the assembly of the motor.

Figure 2A:
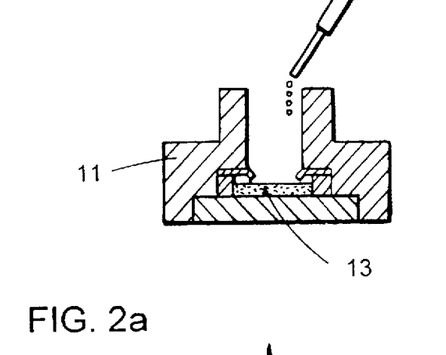
FIG. 2 illustrates steps in a method for inserting bearing fluid in a dynamic pressure bearing device according to a second embodiment of the invention.

A second embodiment of the present invention will now be described with reference to FIG. 2. As shown in FIG. 2(a), a predetermined amount of magnetic fluid 13 is stored in a space on a motor frame 11 under atmospheric conditions such as air.

Figure 2B:
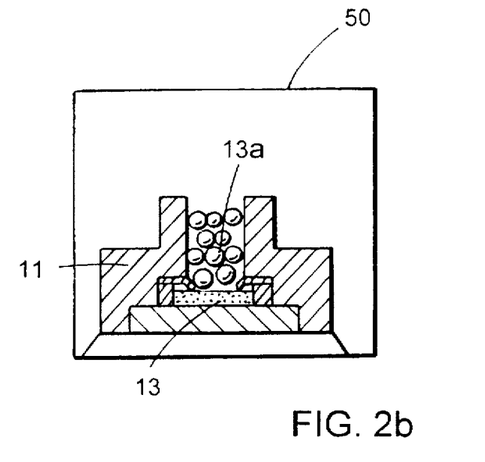
Figure 2C:
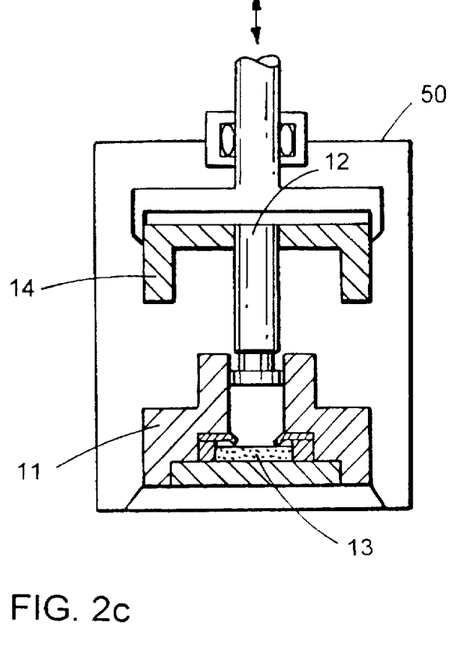

Referring to FIG. 2(b), the whole motor is then inserted into a sealed chamber 50 and a vacuum pump, which is not shown, is used to reduce the pressure inside the chamber 50 to a level below that of the atmosphere outside the chamber 50. Any foam or air bubbles contaminating the bearing fluid 3 are, at this point in the process, formed into a whip 13a and removed.

Figure 2D:
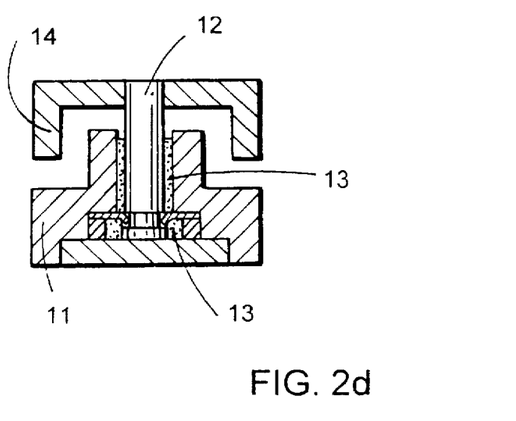

After the chamber 50 is placed in the vacuum state, a shaft 12 including a member or hub 14, which is being held by an instrument not shown such as a robot, is inserted into the space of the motor frame 11. As a result of this operation, the bearing fluid 3 previously placed into the space of the motor frame 11 fills a space formed between the shaft 12 and the motor frame 11. Referring to FIG. 2(d), the motor which is now assembled is removed from the chamber 50.

In certain device structures, a whip similar to the whip 13a described above reaches an opening of an insertion passage of the motor frame 11 and stains a periphery of the device. A method in accordance with a third embodiment of the invention prevents this unwanted occurrence. This is achieved by a method including the steps of: storing a magnetic fluid in a fixed member under a high pressure environment such as air; holding the magnetic fluid in the fixed member with a magnetic body; transferring the fixed member, magnetic fluid and magnetic body to a low pressure environment such as a vacuum; and, assembling a rotating member with the fixed member while in the low pressure environment.

With the third embodiment, if the magnetic fluid stored in the fixed member begins to form into a whip while in the low pressure environment, the whip is quickly destroyed by magnetic forces produced from the magnetic body. As a result, the whip is prevented from forming in the insertion passage of the fixed member, and any air residing in the magnetic fluid or within the fixed member is allowed to escape.

Figure 3A:
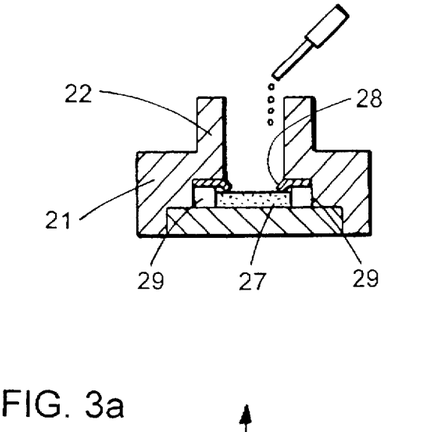
FIG. 3 illustrates steps in a method for inserting magnetic bearing fluid in a dynamic pressure bearing device according to a third embodiment of the invention.

The third embodiment of the invention will now be described in detail with reference to FIG. 3. Referring to FIG. 3(a), a predetermined amount of magnetic fluid 27 is inserted and stored in a bottom part of a cylindrical space provided on bearing holder 22 of motor frame 21 under atmospheric conditions such as air. The magnetic fluid 27 stored in the bottom part of the cylindrical space is held in position by magnetic forces generated from a magnetic body 29.

Figure 3B:
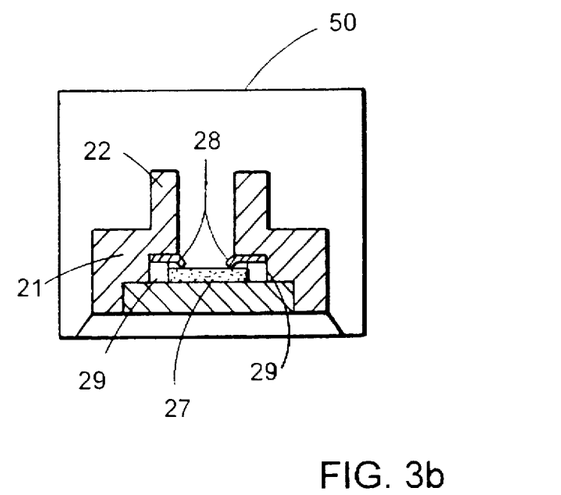
Figure 3C:
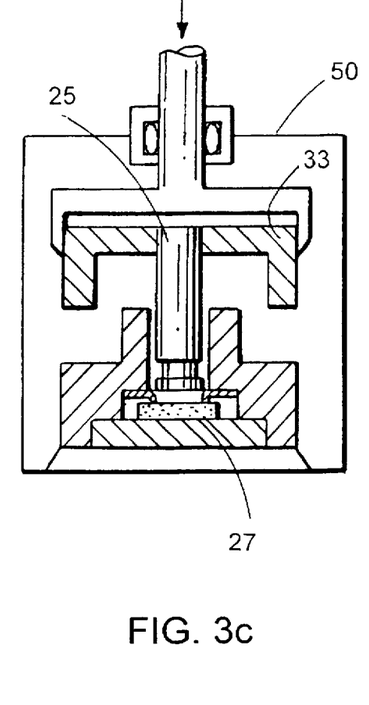

Then, as shown in FIG. 3(b), the motor as a whole is inserted into a sealed chamber 50 and a vacuum pump, which is not shown, is used to reduce the pressure inside the chamber 50 to a level below that of the atmosphere outside the chamber 50. Referring to FIG. 3(c), after the chamber 50 is placed in the vacuum state, a rotating shaft 25 including a required member or hub 33, which is being held by an instrument not shown such as a robot, is inserted into the space of the bearing holder 22. The magnetic fluid 27 stored in the bottom of the cylindrical space then rises along the inside wall of the bearing holder 22 and fills the space created between the shaft 25 and the motor frame 21.

During the steps shown in FIGS. 3(b) and 3(c), the magnetic fluid 27 stored in the bottom part of the cylindrical space attempts to form a whip as a result of the reduced pressure level. However, the whip is destroyed by the forces of the magnetic body 29. As a result, the whip is prevented from forming and any air present in or around the magnetic fluid 27 is allowed to escape through an insertion passage of the bearing holder 22.

Figure 3D:
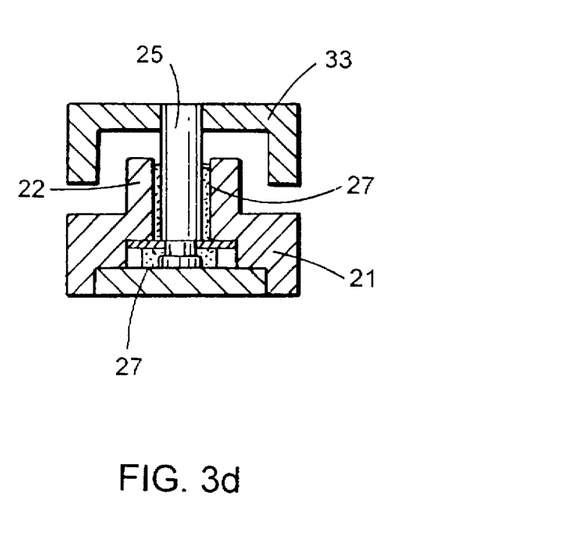

Referring to FIG. 3(d), the entire assembly is then removed from the chamber 50 and returned to atmospheric conditions.

In the device shown in FIG. 3, an engagement projecting piece 28 is provided in the cylindrical space where the magnetic fluid 27 is placed. Air, which is easily held under a bent tip portion of the engagement projecting piece 28, aids in producing unwanted foam or air bubbles in the magnetic fluid 27. However, in the method for inserting magnetic fluid according to the third embodiment of the invention, this air can escape through the insertion passage of the bearing holder 22 during the steps shown in FIGS. 3(b) and 3(c) without forming a whip as described above. Also, given that the air pockets are no longer retained inside the bearing, the magnetic fluid 27 is less likely to leak from the upper end of the bearing holder 22 when subjected to adverse environmental factors such as changes in temperature or pressure.

It is of course to be understood that various changes may be made to the embodiments described above without departing from the scope of the invention. For example, in the abovementioned embodiments, the bearing fluid is inserted and held within the fixed member. It is also possible to use the invention with a device where the bearing fluid is inserted and held within the rotating member.

Also, in each of the above embodiments, conditions outside the sealing chamber 50 were represented as air while conditions inside the sealing chamber 50 were represented as a vacuum state. The invention is not limited by these conditions as long as there is a difference between the pressure outside the sealing chamber 50 and the pressure inside the sealing chamber 50 is sufficient to produce the results described above.

Further, when describing the invention with reference to FIG. 3, the magnetic body used for holding the magnetic fluid was a motor part. It is also possible to use a different magnetic body which is not a motor part, such as a jig, when inserting the magnetic fluid. Specifically, a magnetic body can be provided on a base portion of the sealing chamber 50. Thus, when a magnetic fluid is inserted in a space of a motor and placed under low pressures, any whip which begins to form will be destroyed by the absorbing force of the magnetic body.

Figure 5:
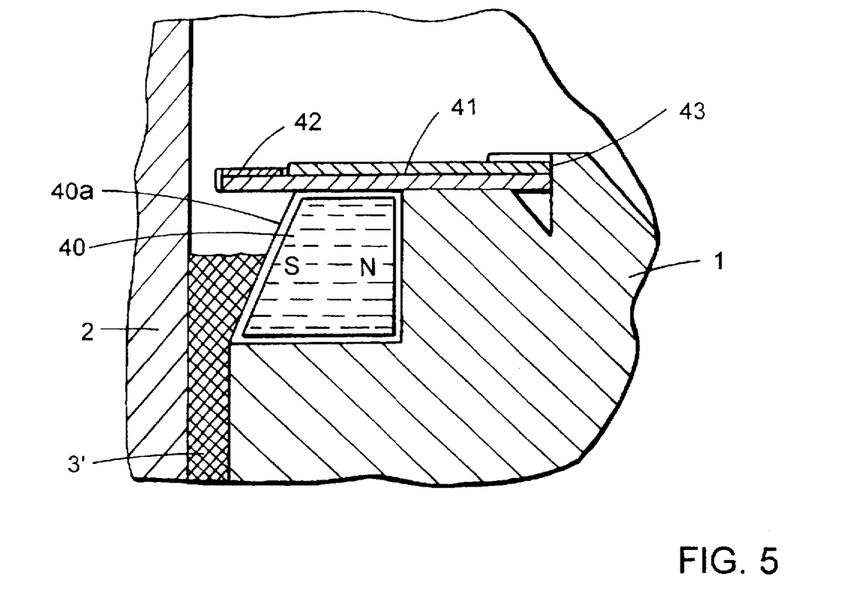
FIG. 5 illustrates a modified version of the device shown in FIG. 4 to which the second embodiment of the invention is applied.

In addition, a modification to the device used to describe a method according to the second embodiment of the invention can be made. Referring to FIG. 5, an opening of a cylindrical space of a motor frame 1 can be modified to include a ring-like magnetic body 40 which is magnetized in a radial direction, such that a magnetic circuit is formed between the magnetic body 40 and the shaft 2.

In particular, when a surface 40a of the magnetic body 40 opposite to the shaft 2 is sloped such that it inclines toward the shaft 2 in a direction opposite an open end of motor frame 1, a magnetic flux density gradient is formed in the space between the magnetic body 40 and the shaft 2 which increases unidirectionally in a direction opposite the open end of the motor frame 1. As a result of this magnetic flux density, the magnetic fluid 3' can be retained in the space between the magnetic body 40 and shaft 2 when subjected to volumetric changes resulting from changes in air pressure and temperature, nonuniformity of motor parts, or an overfilling of the magnetic fluid 3'.

Also, even when the magnetic fluid 3' is moved toward the open end as a result of oscillation forces, collision forces, or other forces which may act upon the motor, the magnetic fluid 3' will eventually return to its original state due to the magnetic forces present.

A plate 41 is provided on an upper surface of the magnetic body 40 along with a coating film 42 and an absorbing agent 43. The plate 41 prevents the magnetic fluid 3' from leaking given that it narrows a passage between the motor frame 1 and the shaft 2. The coating film 42 maintains a slippery surface. Thus, if any magnetic fluid 3' comes into contact with the coating film 42, the magnetic fluid will form into small beads or droplets and return to its original location and state as a result of the magnetic forces present. The oil absorbing agent 43, which is provided on a surface of the plate 41, is made of an oil absorbing material. Consequently, the oil absorbing member 43 will absorb any magnetic fluid 3' which may come into contact with its surface.

The invention according to the second embodiment can also be modified to store a predetermined amount of magnetic fluid 13 in a space of the motor frame 11 in the sealed chamber 50 under a vacuum state, rather than under atmospheric conditions as shown in FIG. 2(a).

The invention according to the third embodiment can similarly be modified to store a predetermined amount of magnetic fluid 27 in a space of the bearing holder 22 of motor frame 21 in the sealed chamber 50 under a vacuum state, rather than under atmospheric conditions as shown in FIG. 3(a).

The present invention is not to be considered limited in scope by the dynamic pressure bearing devices and motors described above and can be applied to other bearing devices and motors as well. Additional advantages and modifications, which will readily occur to those skilled in the art from consideration of the specification and practice of the invention, are intended to be within the scope and spirit of the following claims.

We claim:

1. A method for inserting a bearing fluid in a bearing device where said bearing fluid is inserted in a bearing space formed between a fixed member and a rotating member such that said rotating member is rotatably supported by said bearing fluid, the method selected from a group of methods consisting of:

A. (A1) inserting and holding said bearing fluid in a storage space in one of said fixed member and said rotating member in said relatively high pressure environment; (A2) placing one of said fixed member and said rotating member with said bearing fluid from step (A1) in said relatively low pressure environment; (A3) assembling said fixed member with said rotating member in said relatively low pressure environment to disperse said bearing fluid in said bearing space formed between said fixed member and said rotating member; and (A4) placing said fixed member and said rotating member from step (A3) in said relatively high pressure environment;

B. (B1) inserting said bearing fluid in said storage space in one of said fixed member and said rotating member in said relatively high pressure environment; (B2) holding said bearing fluid in said storage space of one of said fixed member and said rotating member from step (B1) with a magnetic body; (B3) placing one of said fixed member and said rotating member with said bearing fluid from step (B2) in said relatively low pressure environment; (B4) assembling said fixed member with said rotating member in said relatively low pressure environment to disperse said magnetic bearing fluid in said bearing space formed between said fixed member and said rotating member; and (B5) placing said fixed member and said rotating member from step (B4) in said relatively high pressure environment;

C. (C1) inserting and holding said bearing fluid in said storage space in one of said fixed member and said rotating member in said relatively low pressure environment; (C2) assembling said fixed member with said rotating member in said relatively low pressure environment to disperse said bearing fluid in said bearing space formed between said fixed member and said rotating member; and (C3) placing said fixed member and said rotating member from step (C2) in said relatively high pressure environment; and, D. (D1) inserting said bearing fluid in said storage space in one of said fixed member and said rotating member in said relatively low pressure environment; (D2) holding said bearing fluid in said storage space of one of said fixed member and said rotating member from step (D1) with said magnetic body; (D3) assembling said fixed member with said rotating member in said relatively low pressure environment to disperse said bearing fluid in said bearing space formed between said fixed member and said rotating member; and (D4) placing said fixed member and said rotating member from step (D3) in said relatively high pressure environment.

2. A method for inserting a bearing fluid in a bearing device where said bearing fluid is inserted in a bearing space formed between a fixed member and a rotating member such that said rotating member is rotatably supported by said bearing fluid, said method comprising the steps of:

(1) inserting and holding said bearing fluid in a storage space in one of said fixed member and said rotating member in a relatively high pressure environment;

(2) placing one of said fixed member and said rotating member with said bearing fluid from step (1) in a relatively low pressure environment;

(3) assembling said fixed member with said rotating member in said relatively low pressure environment to disperse said bearing fluid in said bearing space formed between said fixed member and said rotating member; and (4) placing said fixed member and said rotating member from step (3) in said relatively high pressure environment.

3. A method for inserting a bearing fluid in a bearing device according to claim 2, wherein said bearing fluid is magnetic fluid.

4. A method for inserting a bearing fluid in a bearing device according to claim 2, wherein said relatively high pressure environment is an atmospheric condition of air and said relatively low pressure environment is a vacuum state.

5. A method for inserting a magnetic bearing fluid in a bearing device where said magnetic bearing fluid is inserted in a bearing space formed between a fixed member and a rotating member such that said rotating member is rotatably supported by said magnetic bearing fluid, said method comprising the steps of:

(1) inserting said magnetic bearing fluid in a storage space in one of said fixed member and said rotating member in a relatively high pressure environment;

(2) holding said magnetic bearing fluid in said storage space of one of said fixed member and said rotating member from step (1) with a magnetic body;

(3) placing one of said fixed member and said rotating member with said magnetic bearing fluid from step (2) in a relatively low pressure environment;

(4) assembling said fixed member with said rotating member in said relatively low pressure environment to disperse said magnetic bearing fluid in said bearing space formed between said fixed member and said rotating member; and (5) placing said fixed member and said rotating member from step (4) in said relatively high pressure environment.

6. A method for inserting a magnetic bearing fluid in a bearing device according to claim 5, wherein said relatively high pressure environment is an atmospheric condition of air and said relatively low pressure environment is a vacuum state.

7. A method for inserting a magnetic bearing fluid in a bearing device according to claim 5, wherein said magnetic body is attached to said fixed member.

8. A method for inserting a bearing fluid in a bearing device where said bearing fluid is inserted in a bearing space formed between a fixed member and a rotating member such that said rotating member is rotatably supported by said bearing fluid, said method comprising the steps of:

(1) inserting and holding said bearing fluid in a storage space in one of said fixed member and said rotating member in a relatively low pressure environment;

(2) assembling said fixed member with said rotating member in said relatively low pressure environment to disperse said bearing fluid in said bearing space formed between said fixed member and said rotating member; and (3) placing said fixed member and said rotating member from step (2) in a relatively high pressure environment.

9. A method for inserting a magnetic bearing fluid in a bearing device where said magnetic bearing fluid is inserted in a bearing space formed between a fixed member and a rotating member such that said rotating member is rotatably supported by said magnetic bearing fluid, said method comprising the steps of:

(1) inserting said magnetic bearing fluid in a storage space in one of said fixed member and said rotating member in a relatively low pressure environment;

(2) holding said magnetic bearing fluid in said storage space of one of said fixed member and said rotating member from step (1) with a magnetic body;

(3) assembling said fixed member with said rotating member in said relatively low pressure environment to disperse said magnetic bearing fluid in said bearing space formed between said fixed member and said rotating member; and (4) placing said fixed member and said rotating member from step (3) in a relatively high pressure environment.

* * * * *